(12) United States Patent
Dominique

(10) Patent No.: US 9,959,082 B2
(45) Date of Patent: May 1, 2018

(54) ENVIRON SYSTEM

(71) Applicant: Shakai Dominique, Fremont, CA (US)

(72) Inventor: Shakai Dominique, Fremont, CA (US)

( * ) Notice: Subject to any disclaimer, the term of this patent is extended or adjusted under 35 U.S.C. 154(b) by 7 days.

(21) Appl. No.: 14/830,586

(22) Filed: Aug. 19, 2015

(65) Prior Publication Data

US 2017/0052748 A1     Feb. 23, 2017

(51) Int. Cl.
*G06F 3/048* (2013.01)
*G06F 3/14* (2006.01)
*G06F 3/01* (2006.01)
*G06F 3/147* (2006.01)
*G06F 3/0484* (2013.01)

(52) U.S. Cl.
CPC ............ *G06F 3/1423* (2013.01); *G06F 3/011* (2013.01); *G06F 3/048* (2013.01); *G06F 3/04847* (2013.01); *G06F 3/147* (2013.01); *G09G 2370/16* (2013.01)

(58) Field of Classification Search
CPC ........ G06F 3/1423; G06F 3/147; G06F 3/048; G06F 3/04847; G09G 2370/16; G09G 2300/026
See application file for complete search history.

(56) References Cited

U.S. PATENT DOCUMENTS

| | | | | |
|---|---|---|---|---|
| 4,903,433 A * | 2/1990 | Baus | ....................... | A47K 3/362 4/607 |
| 5,001,787 A * | 3/1991 | Lynch | ...................... | A47K 4/00 4/538 |
| 5,589,958 A * | 12/1996 | Lieb | ........................ | A47F 3/007 312/114 |
| 8,341,774 B1 * | 1/2013 | Norris | ...................... | A47K 3/34 4/557 |
| 8,646,121 B2 | 2/2014 | Nguyen | | |
| 9,192,267 B2 * | 11/2015 | Tsibulevskiy | ............ | A47K 3/36 |
| 2003/0005514 A1 | 1/2003 | Kunkel | | |
| 2003/0151562 A1 * | 8/2003 | Kulas | .................... | G06F 3/1446 345/1.1 |
| 2004/0107496 A1 * | 6/2004 | Brunelle | ................ | A61H 33/06 4/597 |
| 2004/0160388 A1 * | 8/2004 | O'Keeffe | .................. | E06B 9/24 345/30 |
| 2004/0231045 A1 * | 11/2004 | Carter | .................... | A47K 3/001 4/609 |
| 2005/0102746 A1 * | 5/2005 | Wright | ................... | A47K 3/006 4/555 |

(Continued)

FOREIGN PATENT DOCUMENTS

EP         1 137 284 A2     9/2001

*Primary Examiner* — Antonio Xavier
(74) *Attorney, Agent, or Firm* — Foley & Lardner LLP; Joseph N. Ziebert

(57) ABSTRACT

An environ system includes environ panels arranged to form a partial or full enclosure, wherein each environ panel includes display components that together provide a display area across a majority of a surface of the environ panel facing inward within the enclosure. The environ system further includes a local controller coupled to the environ panels and a master controller coupled to the local controller. The master controller provides control information to the local controller to coordinate a presentation of a visual display sequence across the environ panels.

15 Claims, 7 Drawing Sheets

(56) References Cited

U.S. PATENT DOCUMENTS

| | | | |
|---|---|---|---|
| 2005/0123883 A1* | 6/2005 | Kennen | F41G 3/2611 434/11 |
| 2006/0101688 A1* | 5/2006 | Martin | G09F 9/00 40/606.03 |
| 2006/0139917 A1* | 6/2006 | Ward | G02B 6/0048 362/231 |
| 2007/0182666 A1* | 8/2007 | Hochman | G09F 19/22 345/46 |
| 2007/0213955 A1* | 9/2007 | Ishida | G04G 9/00 702/178 |
| 2007/0220583 A1* | 9/2007 | Bailey | G11B 27/034 725/135 |
| 2008/0041837 A1 | 2/2008 | Benn | |
| 2008/0204668 A1 | 8/2008 | Dammura et al. | |
| 2009/0102805 A1* | 4/2009 | Meijer | G06F 3/016 345/173 |
| 2009/0121970 A1* | 5/2009 | Ozbek | D06F 37/28 345/4 |
| 2009/0262085 A1* | 10/2009 | Wassingbo | G06F 3/03547 345/173 |
| 2011/0102890 A1* | 5/2011 | Eastman | B32B 27/10 359/478 |
| 2011/0186136 A1* | 8/2011 | Hanna | E03C 1/05 137/1 |
| 2011/0234493 A1* | 9/2011 | Kravits | G06F 3/0334 345/160 |
| 2012/0154377 A1* | 6/2012 | Sato | G06F 3/04815 345/419 |
| 2012/0233765 A1* | 9/2012 | Altman | A61H 33/005 4/524 |
| 2012/0323090 A1* | 12/2012 | Bechtel | A61B 5/6889 600/306 |
| 2013/0053068 A1* | 2/2013 | Barkay | G06F 3/017 455/456.3 |
| 2013/0057594 A1* | 3/2013 | Pryor | A63F 3/00643 345/690 |
| 2013/0168647 A1* | 7/2013 | Diekmann | F21S 6/004 257/40 |
| 2013/0171603 A1* | 7/2013 | Self | G09B 5/065 434/317 |
| 2013/0181901 A1* | 7/2013 | West | G09G 5/14 345/161 |
| 2013/0188105 A1* | 7/2013 | Dobrenko | E06B 9/24 349/16 |
| 2013/0242370 A1* | 9/2013 | Wang | G02F 1/163 359/275 |
| 2013/0278501 A1* | 10/2013 | Bulzacki | G06F 3/017 345/157 |
| 2013/0324241 A1* | 12/2013 | Elliott | A63F 13/90 463/31 |
| 2014/0129263 A1* | 5/2014 | Brazell | G06Q 50/12 705/5 |
| 2014/0192087 A1* | 7/2014 | Frost | G06F 3/011 345/633 |
| 2014/0219630 A1* | 8/2014 | Minder | G11B 27/005 386/241 |
| 2015/0046490 A1* | 2/2015 | Jacobson | G06F 17/30424 707/769 |
| 2015/0070319 A1* | 3/2015 | Pryor | G06F 3/0425 345/175 |
| 2015/0258432 A1* | 9/2015 | Stafford | A63F 13/213 463/32 |
| 2015/0294086 A1* | 10/2015 | Kare | G06F 19/3481 705/3 |
| 2015/0309543 A1* | 10/2015 | Bleistern | G06F 1/182 361/679.21 |
| 2015/0355521 A1* | 12/2015 | Alton | G02F 1/167 250/214 AL |
| 2016/0246039 A1* | 8/2016 | Graf | G02B 19/0042 |
| 2016/0314620 A1* | 10/2016 | Reilly | G06Q 19/006 |
| 2017/0045797 A1* | 2/2017 | Yamamoto | A41D 23/00 |

\* cited by examiner

ENVIRON SYSTEM

BACKGROUND

Field of the Disclosure

This disclosure describes an environ system that presents a selected environ to a user, where the environ may be interactive.

SUMMARY

According to an aspect of the present disclosure, an environ system includes environ panels arranged to form a partial or full enclosure, wherein each environ panel includes display components that together provide a display area across a majority of a surface of the environ panel facing inward within the enclosure. The environ system further includes a local controller coupled to the environ panels and a master controller coupled to the local controller. The master controller provides control information to the local controller to coordinate a presentation of a visual display sequence across the environ panels.

In an embodiment, one of the environ panels includes receptor components, and the master controller receives information from the receptor components and alters the presentation of the visual display sequence responsive to the information from the receptor components.

In an embodiment, altering the presentation of the visual display sequence includes altering a portion of the visual display sequence in an area around receptor components from which an indication of movement was received, to simulate an interactive response of an environment depicted by the visual display sequence.

In an embodiment, the visual display sequence provides a three-dimensional view of an environment.

In an embodiment, the plurality of environ panels includes a ceiling panel.

In an embodiment, the plurality of environ panels includes a floor panel.

In an embodiment, the environ system includes an environ enhancement generator that provides additional features including one or more of sound, wind, heat, cold, or a mineral infusion. The master controller is coupled to the environ enhancement generator, and provides control information to the environ enhancement generator to coordinate a provision of additional features with the presentation of the visual display.

In an embodiment, an environ panel is a single sheet of transparent or opaque material with display components embedded into, or formed on, the sheet.

In an embodiment, the enclosure is a shower or bath enclosure, and the environ panels are waterproof.

In an embodiment, the enclosure is a bathtub enclosure, and the environ panels include a bathtub panel.

According to an aspect of the present disclosure, a shower or bath enclosure system includes at least two adjacent waterproof environ panels, each environ panel including receptor components, display components and display circuitry coupled to the display components. The environ system further includes a controller coupled to the display circuitry and to the receptor components, and the controller receives information from the receptor components and provides information to the display circuitry. The information provided to the display circuitry directs the display circuitry of each environ panel to present a portion of a scene, such that the whole of the scene is displayed across the combined environ panels. The controller is further configured to alter the information provided to the display circuitry responsive to information from the receptor components.

In an embodiment, the information from the receptor components is movement detection information.

In an embodiment, the information from the receptor components is touch detection information.

In an embodiment, the shower or bath enclosure system includes an environ enhancement generator configured to provide additional features including one or more of sound, wind, heat, cold, or an infusion of minerals.

In an embodiment, the controller is coupled to the environ enhancement generator, and the controller provides control information to the environ enhancement generator to coordinate a provision of additional features coordinated with the display.

In an embodiment, the shower or bath enclosure system includes a control panel coupled to the controller, the control panel including a selection of scenes or scene sequences to be displayed.

In an embodiment, the control panel is attached externally to the shower or bath enclosure.

In an embodiment, the control panel is displayed on an environ panel.

According to an aspect of the present disclosure, an environ system includes three adjacent environ panels forming a partial or full enclosure, display components embedded in each environ panel such that a majority of an inward-facing surface of each environ panel forms a display, and a controller that controls the display components of each environ panel to display a different scene sequence. The different scene sequences of the adjacent environ panels together simulate a three-dimensional view. The environ system includes an environ enhancement generator, wherein the controller further coordinates features provided by the environ enhancement generator with the scene sequence of the simulated three-dimensional view.

DETAILED DESCRIPTION

This disclosure describes an environ system that provides an interactive experience. The environ system includes a partial or full enclosure made of one or more panels. Examples of such enclosures include, without limitation, a shower enclosure, a bathtub enclosure, a tanning booth, an isolation chamber, an entertainment chamber, a voting booth, a dressing room, and other partial or full enclosure.

A person within an enclosure of the environ system may interact with the enclosure to change the environ perceived by the person, and further interact with the perceived environ.

In one example, a person may select to transform the enclosure into a beach environ. In one or more embodiments, the environ system would transform all of the surface area of the enclosure into a beach environ; for example, the ceiling would include an environ of sky, clouds and birds; the walls would include an environ of sky, sand and water; and the floor would include an environ of water and sand. In such a full beach environ, in one or more embodiments, the birds would fly across the sky, the clouds would traverse the sky, the water would move in waves and the waves would appear to come up the beach across the floor area where the person is standing. In one or more embodiments, the environ is interactive. In the beach environ, for example, dabbling a toe in the "waves" as they move across the floor area would result in the "water" being disturbed, and reaching out to touch a "dolphin" would result in the "dolphin" reacting to the "touch". In one or more embodiments, the environ system further provides for enhancements to the environ, such as wind, heat or cold (e.g., steady temperature or temperature change), and smell. In one or more embodiments, enhancements to the environ include an infusion of minerals into the environ.

In one or more embodiments, the enclosure is a shower enclosure. The beach environ presented in the shower enclosure, for example, allows a person to take a quick and inexpensive stay-at-home vacation (staycation) in the privacy of their own home, while performing an ordinary task such as showering.

Staycationing is but one use for the interactive environ system of this disclosure. In one or more embodiments, the environ is an interactive learning environ. For example, a teacher may provide a language lesson, in which words are pronounced for the person, and speech recognition is used to identify whether the person then in turn pronounces the words correctly. For another example, a voice coach may provide feedback on pitch or tone, or timing of a phrase. For a further example, a math teacher may provide a lesson, the person may answer questions verbally or solve problems on the walls (or floor) of the enclosure, and the problems are checked by the teacher. For another example, with sufficient enclosure space, interactive learning could be used to improve a golf swing, or a technique for throwing a football, or the like.

Figure 8:
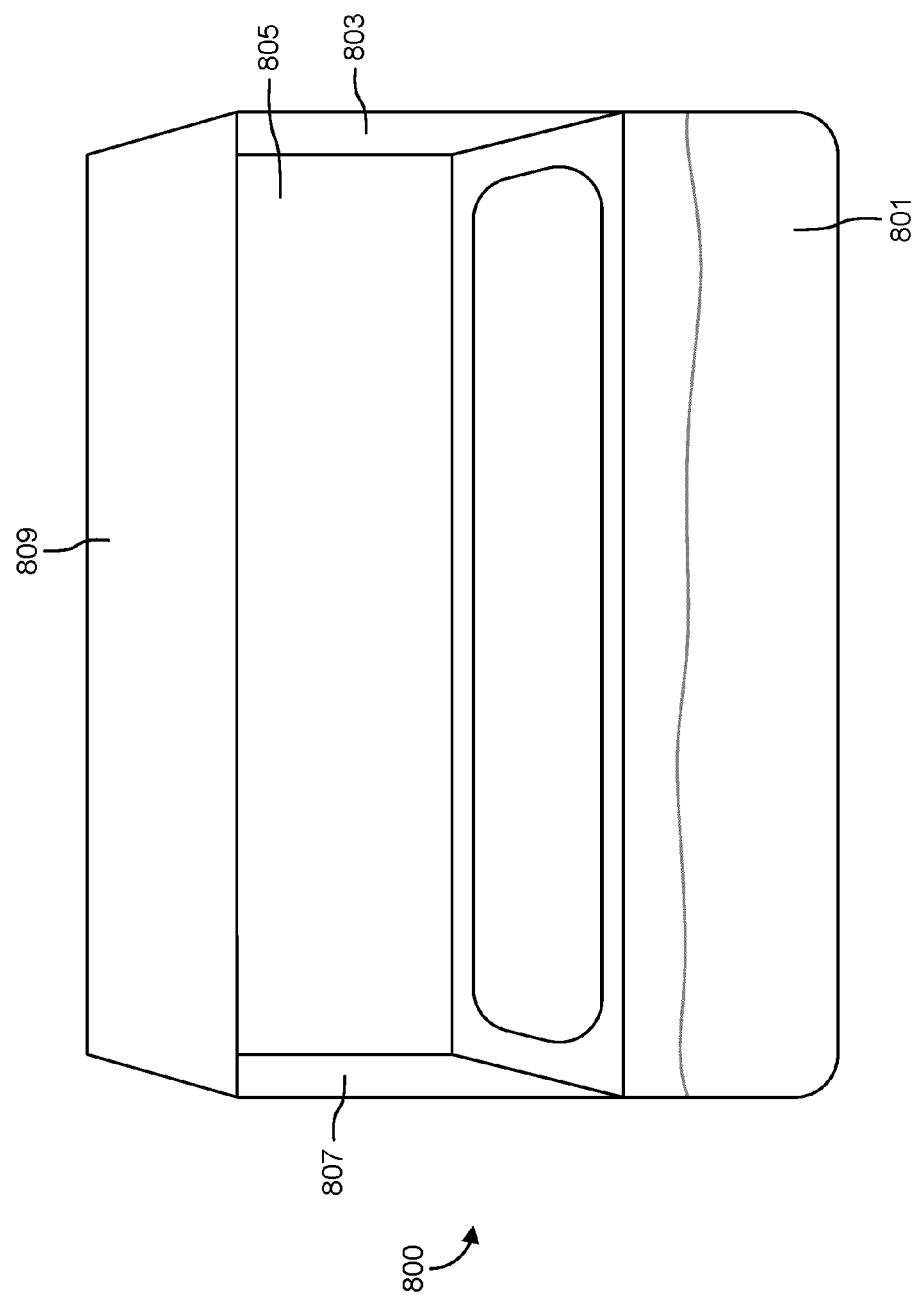
FIG. 8 is an illustration of an example environ system according to an embodiment of the present disclosure.

Extending the concept to a bathtub 801, the ability to engage a child with an interactive bathtub enclosure 800 as shown in FIG. 8 provides an incentive for the child to stay in the bathtub 801 longer and thereby (hopefully) achieve a higher degree of cleanliness, or to take a bath more often. For example, the walls (e.g., walls 803, 805, 807) around the bathtub 801, and the bathtub itself or a cover panel 809 over the bathtub, may be interactive panels. In a bathtub embodiment, for example, a child may appear to swim with sea life, take a mud bath with piglets, race a go-cart, solve a puzzle, play the piano or drums, write or type, draw a picture, and other engaging activities. In this and other embodiments, the interactive input from the child (or other person in an environ system 100) may be stored in a memory for future access. Thus, for example, a musical creation may be played back later, or printed as sheet music.

As will be apparent, there may be many embodiments of the environ system 100, including the examples described above.

Figure 1:
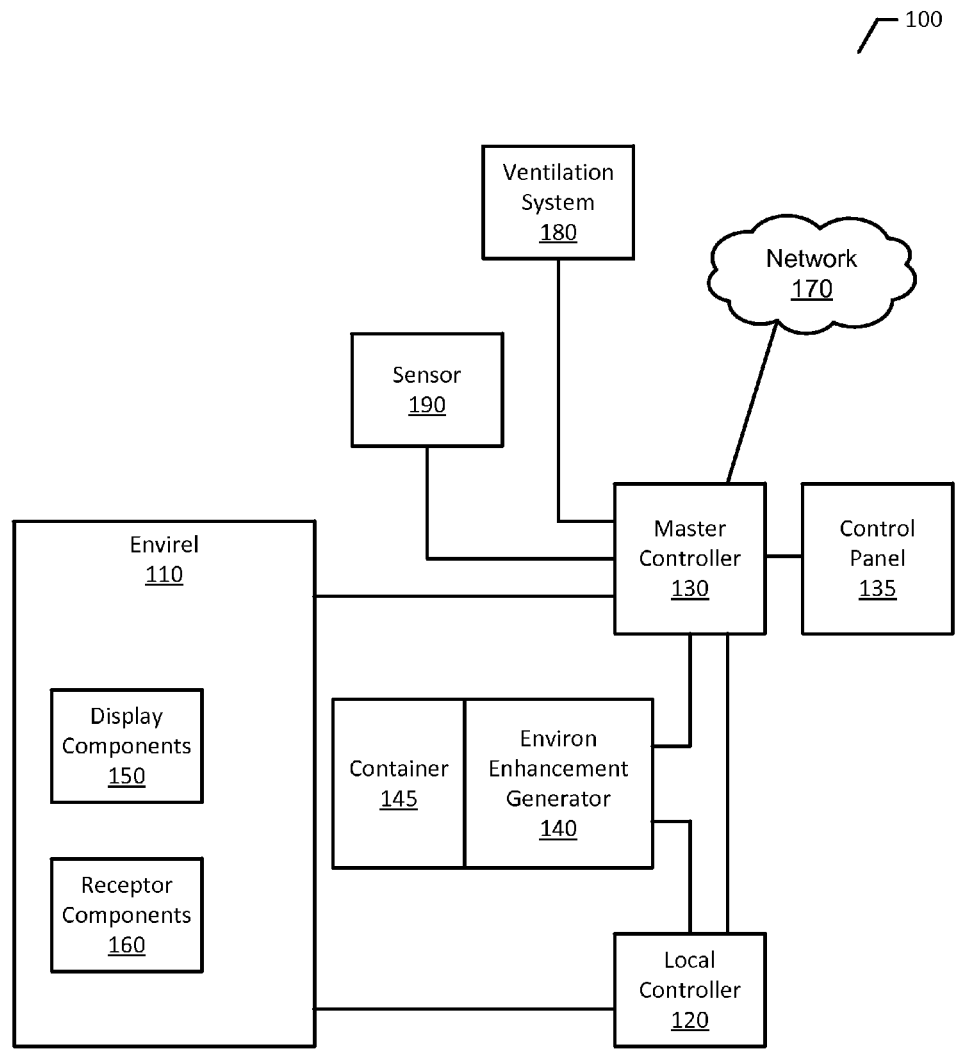
FIG. 1 is a diagram of an example of an environ system according to an embodiment of the present disclosure.

FIG. 1 illustrates an environ system 100 with one or more environ panels ("Envirels") 110. Some examples of embodiments of Envirel 110 are described with respect to FIGS. 4A, 4B and 5.

A local controller 120 is coupled to each Envirel 110. Environ system 100 may optionally include a master controller 130, which is coupled to one or more local controllers 120 for centralized control. Local controller 120 and master controller 130 are examples of computing devices, which are described below with respect to FIG. 2.

In one or more embodiments, local controller 120 is positioned directly on an Envirel 110, such as within a housing attached to or integrated into the Envirel 110. In one or more embodiments, local controller 120 is positioned away from Envirel 110, such as positioned on a wall or on the floor, and is coupled to one or more Envirels 110 through wires or wirelessly. In one or more embodiments, local controller 120 is formed as part of Envirel 110, such as printed circuits on a surface of Envirel 110, printed circuits between layers of material used to form Envirel 110, semiconductor devices built into Envirel 110, or a combination thereof.

In one or more embodiments, one local controller 120 is coupled to multiple Envirels 110. In one or more embodiments, multiple local controllers 120 may be coupled to a single Envirel 110. Thus, there may be one local controller 120 or multiple local controllers 120, each local controller 120 is coupled to one or more Envirels 110, and each Envirel 110 is coupled to one or more local controllers 120.

Local controller 120 controls display components 150 within Envirel 110 to provide a selected visual environ. By way of non-limiting example, display components 150 may include organic or inorganic materials, such as including phosphor or other photoluminescent material, plasma, liquid crystal, light emitting diode, electrophoretic, quantum dot, surface conduction electron emitter, or field emission display components, or a combination thereof. Display components 150 further include appropriate circuitry for coupling to local controller 120.

Local controller 120 further controls detection of interactive movements by way of controlling receptor components 160. By way of non-limiting example, receptor components 160 include capacitive sensors, resistive sensors, or inductive sensors for sensing presence or pressure; or photodiodes, CMOS sensors, infrared sensors, thermal sensors, or charge-coupled device (CCD) sensors for detecting movement or for capturing images. In one or more embodiments, infrared sensors are positioned around a periphery of an Envirel 110 and aligned with light-emitting diodes or other light sources to form several light/sensor pairs, such that when a finger, hand, foot, or the like crosses a light beam from the light source, the interruption in the light beam is detected as movement, and the movement may be isolated to a particular portion of the Envirel 110 by detecting interruptions in multiple light beams. In one or more embodiments, receptor components 160 include a camera and/or three-dimensional sensors. Receptor components 160 further include appropriate circuitry for coupling to local controller 120. Local controller 120 may detect movements periodically, occasionally, or at the occurrence of an event. For example, local controller 120 may select certain ones of receptor components 160 periodically to detect coarse-detail information about movement, and if movement is detected, may select receptor components 160 around the movement to provide fine-detail information about the movement. In another example, a change in voltage or current level representing a receptor component 160 or a row or column in an array of receptor components 160 may be used to notify local controller 120 that movement is occurring, to initiate further investigation of the movement through receptor components 160. In a further example, motion detection is used to notify local controller 120 that movement is occurring, to initiate further investigation of the movement through other receptor components 160.

Master controller 130 orchestrates a presentation of a selected environ to a user, and facilitates the interaction of the user with Envirel 110. In one or more embodiments, one local controller 120 may function as a master controller 130, or as both a local controller 120 and a master controller 130. In one or more embodiments, the functionality of master controller 130 is divided among two or more local controllers 130. In one or more embodiments, two or more local controllers 120 may be connected as a peer-to-peer network.

In one or more embodiments, master controller 130 includes programmed instructions (e.g., instructions stored in a memory, instructions built into the hardware, or a combination thereof) for implementing a selected environ. For a selected environ, master controller 130 provides direction to a local controller 120 of Envirel 110 to display a scene, or a sequence of scenes, across a surface of Envirel 110. Master controller 130 may provide direction to local controllers 120 of multiple Envirels 110 to display a scene, or a sequence of scenes, where each Envirel 110 displays a different (but coordinated) scene or sequence of scenes, such that the combined effect is the simulation of the person's presence within the selected environ. Thus, in one or more embodiments, environ system 100 presents a simulated three dimensional view of the selected environ.

In one or more embodiments, when master controller 130 directs local controller 120 of an Envirel 110 to display a scene or scenes, the direction is in the form of initiating the display, where the scene or scenes are stored at local controller 120. In one or more embodiments, when directing local controller 120 of an Envirel 110 to display a scene or scenes, the direction is in the form of a data stream encoding the scene or scenes to display. Such data stream may be formatted in a standard or proprietary protocol for image or video transmissions, and may have a compression, encryption, or other technique applied. In one or more embodiments, the direction provided by master controller 130 includes directions related to video features, such as directions related to one or more of duration, speed of scene sequencing, brightness, contrast, whether or not to stretch the display to fit to the Envirel 110 surface, the height of an area on which to provide the display, a width of an area on which to provide the display, special effects, amount of skew to apply, whether or not video mosquito noise should be compensated, and so forth.

In one or more embodiments, local controller 120 detects movement or position by way of receptor components 160, and provides movement or position information, or touch information, to master controller 130, which alters a portion of, or all of the displayed environ based on the movement, position or touch information. For example, master controller 130 may alter a portion of the visual display sequence in an area around receptor components 160 from which an indication of movement was received, to simulate an interactive response of an environment depicted by the visual display sequence.

In one or more embodiments, a data stream encoding a scene or scenes is received by master controller 130 via a network 170 and provided to local controller(s) 120; the receiving and providing may be concurrent, such that master controller 130 provides one portion of the data stream to local controller(s) 120 while receiving the next portion of the data stream, or the receiving of the data stream by master controller 130 is completed prior to providing a first part of the data stream to local controller(s) 120.

Data streams received by master controller 130 may be in a different format, or encoded using a different encoding scheme, than data streams provided by master controller 130 to local controller(s) 120. Further, communication between master controller 130 and network 170 may be via a different interface and different protocol than communication between master controller 130 and local controller(s) 120. For example, in one or more embodiments, communication between master controller 130 and network 170 is via CAT5 or CAT6 cable (or other communication cable) using an Ethernet protocol, whereas communication between master controller 130 and local controller(s) 120 is via a wireless interface using a Wi-Fi network protocol. Ethernet and Wi-Fi networks, interfaces, and protocols are non-limiting examples, and other networks, network interfaces, and protocols are within the scope of this disclosure.

A control panel 135 is used to interact with environ system 100. A detailed example of a control panel 135 is provided below with respect to FIG. 6.

Environ system 100 includes an environ enhancement generator 140 coupled to one or more of master controller 130 and local controllers 120. Environ enhancement generator 140 may provide additional features to augment a displayed environ, or may provide features when there is no displayed environ in progress. By way of non-limiting examples, environ enhancement generator 140 may include one or more feature generators, such as sound, wind, light, heat or cold, or smell generators, or a mineral diffuser. For example, a queue of smells could be provided sequentially at intervals to create an aromatic ambience; smells could be provided at points in time coincident with particular images, sounds or melodies, or coincident with wind, heat or cold; sound and wind could be coincidentally provided for a soothing atmosphere; and minerals may be infused into the environ with or without other environ enhancement features. Other combinations of features may be provided as well. In one or more embodiments, a sequence and/or combination of features provided by environ enhancement generator 140 may be preprogrammed as instructions in a software file or the like.

By way of non-limiting examples, a sound generator may be a speaker, a wind generator may be a fan, a light generator may be a bulb, LED, LED array, or other light source, a heat generator may be a heating coil, and a cold generator may be a condenser. A smell generator may be a device controlled, for example, to scratch a coated or impregnated surface to release chemicals in solid or gas form; to puncture a blister on a blister strip or blister pack to release chemicals in solid, gas or liquid form; or to cause a drip of liquid or a puff of gas or powder to be released from a vial. Other examples of these feature generators are also within the scope of this disclosure.

In one or more embodiments, the environ is a brine shower or bath for improving the health and/or wellness of a person. For example, in a shower enclosure embodiment, the environ enhancement generator 140 may include a system for infusing the shower water or the air with user-selected salts, minerals, or other therapeutic or wellness additives. These salts, minerals, and additives may include, but are not limited to, Himalayan crystal salt, Epsom salt, herbs, flowers such as lavender, and medicinal compounds. A bath or shower comprised of a brine of Himalayan Crystal Salt may have a detoxifying or cleansing effect on the body, or may enhance the body's self-healing powers. A brine bath or shower may also function to maintain the natural, protective film of the skin to prevent it from drying out. Further, a bath or shower with mineral additives may penetrate the skin with ions, resulting in enhanced cell growth.

In one or more embodiments, the salts, minerals, and additives in the brine shower example may be in a packed form, such as cylinder that can be added to the water or positioned in a stream of water prior to the water being dispensed from the shower head or other spigot. In one or more embodiments, the person may select such a cylinder from a control panel, and an automated infusion system may cause the selected cylinder to be positioned in the water stream, or added to a water reservoir to allow the minerals and additives to steep before providing the infused water to the shower. Accordingly, environ enhancement generator 140 may include a storage area for placement of the cylinders (or other form) which is accessible for restocking.

In one or more embodiments, the optimal concentration of salt in the brine shower water example is similar to the concentration of salt in human body fluids in order to activate an osmotic exchange ratio. In one or more embodiments, this concentration is approximately 1% salt. In one or more embodiments, the appropriate salts, minerals, and additives, as well as the amount and temperature of water in the brine shower or bath will be auto-selected for the person by a computer program based on a number of personal characteristics and safety considerations including, but not limited to, age, height, weight, and any relevant disease and/or health conditions.

Environ enhancement generator 140 may further include a computing device for controlling one or more of the feature generators. Local controller 120 or master controller 130 may direct environ enhancement generator 140 by way of directing the computing device of environ enhancement generator 140, such as by providing an initiating signal indicating for the computing device to control a predefined sequence of features to be generated, or such as by providing step-by-step instructions for turning a feature generator on or off or partially on or off.

Where applicable, a container 145 is coupled to environ enhancement generator 140, to hold materials used for providing scent, salts, minerals or other additives.

Network 170 represents one or more public or private networks. For example, network 170 may represent a local area network (LAN), a home network in communication with a LAN, a LAN in communication with a wide area network (WAN) such as the Internet, a WAN, or other networks, or a combination of networks. Portions of one or more network may be wired, and portions of one or more networks may be wireless. Further, network 170 may include one or more of telephone networks, cellular networks, or broadband networks. Communication through the networks may be made using standard or proprietary protocols useful for the associated network. Although certain types or protocols of networks are described for particular embodiments in this disclosure, such types or protocols are not limiting unless so described, and it is to be understood that the concepts of this disclosure are generally applicable to a wide variety of network environments.

In one or more embodiments, a ventilation system 180 is controlled by master controller 130, to remove steam, scents, or an excess of minerals, as applicable. Such a ventilation system 180 may be provided as part of environ system 100, or master controller 130 may be coupled to an existing ventilation system 180. In one or more embodiments in which master controller 130 controls ventilation system 180, one or more sensors 190 monitor the enclosure of environ system 100 for levels of steam, scent, minerals, or heat crossing a respective threshold, to determine when to activate the ventilation system 180, or increase ventilation through ventilation system 180. Such sensors 190 may be formed as part of an Envirel 100, or attached to Envirel 100.

Each available environ to be presented in environ system 100 is stored in a memory, and master controller 130 may provide a menu of stored environs to a user, such as providing a menu icon, and when the menu icon is selected by the user, the available stored environs are listed (or displayed as icons) for selection by the user. Master controller 130 may provide the menu by directing a display to provide the menu icon and the environ list or icons, such as directing one or more of Envirel 110, a display attached to master controller 130, or a display at a distance from master controller 130. The menu icon may be displayed at one location, or may be displayed concurrently at multiple locations. Once the menu icon is selected, the environ list or icons may be displayed at the location where the menu item was selected, at a different location, or at multiple locations.

An example of a selected environ presented in environ system 100 is provided next, to provide a better understanding of the capabilities of environ system 100. In the example, the selected environ is riding a motorbike through the Alps. Master controller 130 may direct local controller 120 of an Envirel 110 on one side of an enclosure to display a view of the left side of the road, may direct local controller 120 of an Envirel 110 on another side of the enclosure to display a view of the right side of the road, and may direct local controller 120 of an Envirel 110 between the two other Envirels 110 to display a view of the road ahead; thus, as the Envirels 110 display a coordinated sequence of scenes, the user perceives the Alps environ as viewed from a moving motorbike. Master controller 130 may further direct environ enhancement generator 140 to add features, such as turning on a blower or blowers at varying speeds to simulate wind, wind gusts, or change in wind direction due to the motorbike turning a corner; or features such as turning on a cooling source for simulating the cold of the snow in the Alps, while turning on one or more heat lamps at varying intensity to simulate the sun shining from the appropriate angle as the motorbike changes directions in a switch-back; or features such as issuing various smells at appropriate times to simulate passing a field of flowers, a herd of elk, or smoke from a chimney; or features such as playing a sound track to correspond to the sound of the motorbike and sounds in the passing scene.

The example of the motorbike in the Alps illustrates the orchestration of the various displays and other features that is performed by master controller 130, to keep the displays and features aligned in space and time.

As noted above, local controller 120 and master controller 130 are examples of computing devices, and environ enhancement generator 140 may include a computing device. Accordingly, portions of the environ system 100 of this disclosure may be implemented as computer-executable instructions.

Figure 2:
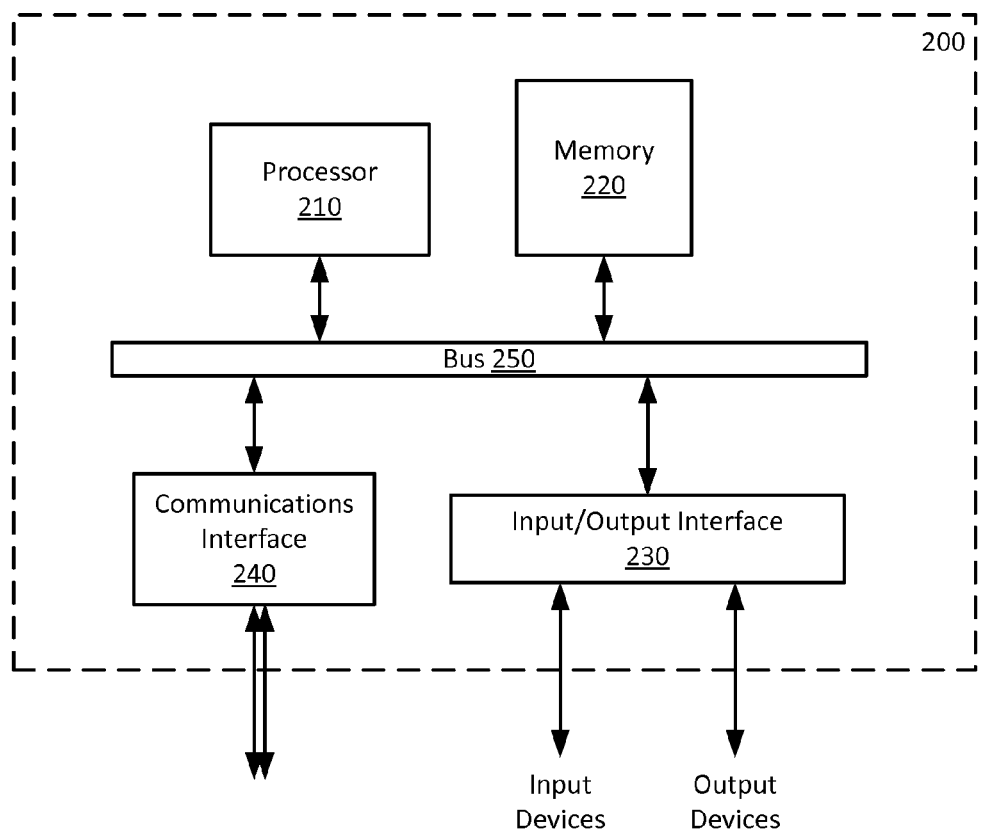
FIG. 2 is a diagram of an example of a computing device.

FIG. 2 illustrates an example of a computing device 200 that includes a processor 210, a memory 220, an input/output interface 230, and a communication interface 240. A bus 250 provides a communication path between two or more of the components of computing device 200. The components shown are provided by way of illustration and are not limiting. Computing device 200 may have additional or fewer components, or multiple of the same component.

Processor 210 represents one or more of a general-purpose processor, digital signal processor, microprocessor, microcontroller, application specific integrated circuit (ASIC), field programmable gate array (FPGA), other circuitry effecting processor functionality, or a combination thereof, along with associated logic.

Memory 220 represents one or both of volatile and non-volatile memory for storing information (e.g., instructions and data). Examples of memory include semiconductor memory devices such as EPROM, EEPROM and flash memory devices, magnetic disks such as internal hard disks or removable disks, magneto-optical disks, CD-ROM and DVD-ROM disks, and the like.

Portions of environ system 100 may be implemented as computer-readable instructions in memory 220 of computing device 200, executed by processor 210.

Input/output interface 230 represents electrical components and optional code that together provide an interface from the internal components of computing device 200 to external components. Examples include a driver integrated circuit with associated programming.

Communications interface 240 represents electrical components and optional code that together provides one or more interfaces from the internal components of computing device 200 to external networks, such as a network through which local controller(s) 120 and master controller 130 communicate with each other, or such as network 170, or both.

Bus 250 represents one or more interfaces between components within computing device 200. For example, bus 250 may include a dedicated connection between processor 210 and memory 220 as well as a shared connection between processor 210 and multiple other components of computing device 200.

An embodiment of the disclosure relates to a non-transitory computer-readable storage medium (e.g., a memory 220) having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as ASICs, programmable logic devices (PLDs), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

Having described the environ system 100 in overview, an example of an embodiment in the form of a neo-angle shower enclosure is described next according to an embodiment of the present disclosure.

Figure 3:
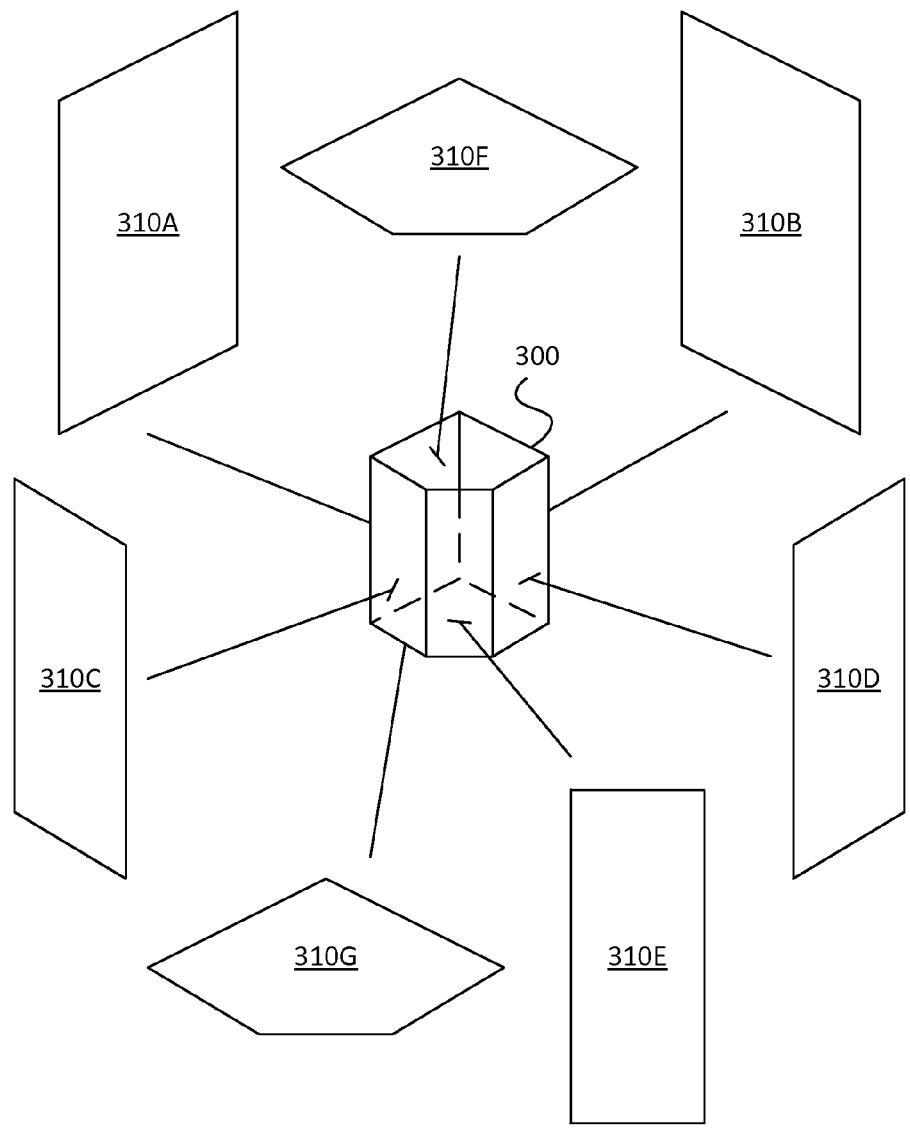
FIG. 3 is an illustration of an embodiment of an environ system with exploded views.

FIG. 3 illustrates an example of an environ system 300 with seven Envirels 310 as implemented in the neo-angle shower enclosure, where the seven Envirels 310A, 310B, 310C, 310D, 310E, 310F and 310G are shown with an indication of their respective placement in the neo-angle shower enclosure. Envirels 310A, 310B, 310C, 310D and 310E are the sides of the shower enclosure, Envirel 310F is a ceiling of the shower enclosure, and Envirel 310G is a floor of the shower enclosure. One or more of Envirels 310A-310E may be mounted to a building wall. However, in one or more embodiments, the environ system 300 is free-standing, with structural components such as rods, brackets or crossbars attaching Envirels 310 together. One or more Envirels 310 serve as an access to environ system 300. For example, one of Envirels 310A, 310B, 310C, 310D and 310E may be a door, with hinges on one edge attached to another Envirel 310 or to a building wall. Although seven Envirels 310 are illustrated for environ system 300, there may instead be one, two, three, four, five or six of the seven Envirels 310A, 310B, 310C, 310D, 310E, 310F and 310G used in the neo-angle shower enclosure embodiment. For example, Envirel 310A may be implemented alone, or Envirels 310B, 310D, and 310G may be implemented together, or Envirels 310A, 310B, and 310F may be implemented together, or any other combination of Envirels 310 may be implemented together. For the neo-angle shower enclosure example, standard shower enclosure materials may be used for the building walls, ceiling and floor surfaces that are not Envirels 310.

Envirels (such as Envirels 110, 310) may be rigid, semi-rigid, or non-rigid, depending on the intended positioning of the Envirel; an Envirel may be, but is not necessarily, semi-rigid or non-rigid if the Envirel will not be used to support itself or other Envirels. For example, a hanging Envirel may be flexible (non-rigid). Thus, for the example of the neo-angle shower enclosure of FIG. 3, although Envirels 310 are illustrated as rigid structures, one or more of the Envirels 310 may be in the form of a folding panel, a segmented panel with semi-rigid segments, or a shower curtain, which may, in some embodiments, include a structure allowing the shower curtain to be made taught while being used as a display. An Envirel placed against a building wall or attached to a building wall also may be flexible, supported by the building wall. As can be seen, Envirel 100 may be installed temporarily or permanently over an existing structure (e.g., a shower enclosure).

In one or more embodiments, Envirel 110 includes a transparent or marginally opaque structural material, such as clear glass or see-through silicon. However, Envirel 110 is not limited to transparent or opaque materials.

In one or more embodiments, Envirel 100 is heated, such as by including heating elements within the Envirel 100. In one or more embodiments, Envirel 100 is one or more of mildew resistant, self-cleaning, and buildup (e.g., calcium or lime scale, or soap residue) resistant.

In one or more embodiments, the surface materials and/or surface coatings of the environ system 100 will be selected for their resistance to damage or degradation caused by salts, minerals, steam, and water.

Figures 4A, 4B, 4C:
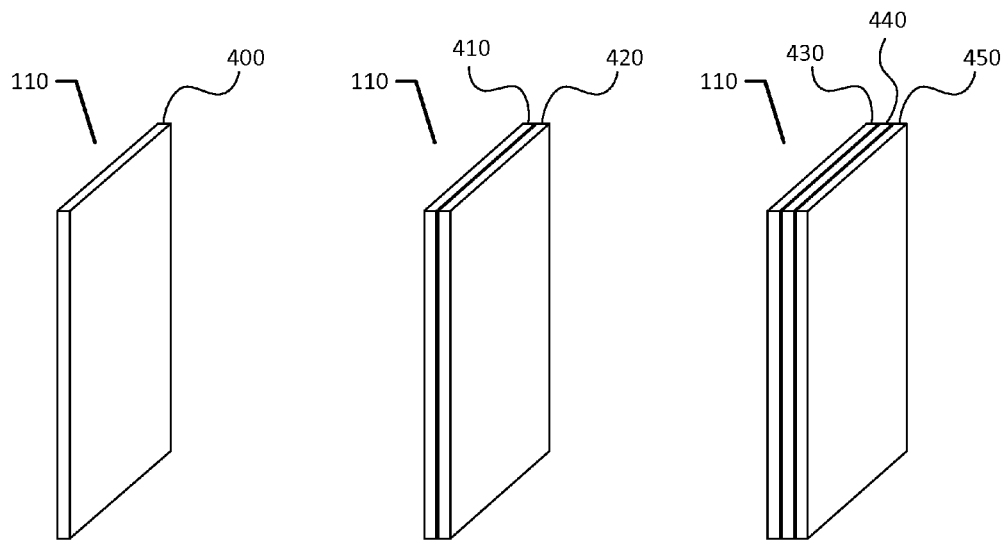
FIGS. 4A, 4B and 4C are illustrations of environ system panels according to embodiments of the present disclosure.

FIGS. 4A-4C illustrate examples of ways in which an Envirel 110 (e.g., Envirel 310) may be constructed. FIG. 4A illustrates an Envirel 110 that is formed using a single panel 400, FIG. 4B illustrates an Envirel 110 that is formed from two panels 410, 420, and FIG. 4B illustrates an Envirel 110 that is formed from three panels 430, 440, 450. Although shown as flat panels, any of the Envirels 110 shown in FIGS. 4A-4C may be curved, or may have a portion that is curved. Thus, for example, a circular or elliptical environ system 100 may be constructed, or an environ system 100 with partially flat surfaces and partially curved surfaces may be constructed. Further, each of the Envirels 110 shown in FIGS. 4A-4C are seamless on the side facing inwards towards a viewer within environ system 100.

In FIG. 4A, a single panel 400 Envirel 110 is illustrated. The display components 150 are formed on, or embedded into, panel 400 so as to be seen by a viewer from within environ system 100. The circuitry to activate the display components 150 is also formed on, or embedded into, panel 400, such as on or in a surface of panel 400 that is facing away from the viewer. In one or more embodiments, the display components 150 and/or the circuitry are formed on, or embedded into, panel 400 by processes similar to those used in the semiconductor industry to form integrated circuits in semiconductor devices. In one or more embodiments, the display components 150 and/or the circuitry are disposed on panel 400 using a deposition or spraying technique to form the display components 150 and/or the circuitry on a surface of panel 400.

In FIG. 4B, panel 410 faces towards the viewer, and panel 420 is behind panel 410, at the side of panel 410 facing away from the viewer. In one or more embodiments, panel 410 is a sheet of material, such as a pane of glass, plastic, polyester, nylon, silicon, or a combination thereof, and panel 420 is a sheet of display components 150 and circuitry, where panel 420 is attached (such as laminated) onto panel 420 at a manufacturing facility or at the intended destination of the associated environ system 100 (such as at the address where the neo-angle shower enclosure of FIG. 3 is to be installed). In one or more embodiments, panel 410 is a sheet of transparent or opaque material in which, or on which, a portion of the display components 150 and/or the circuitry are formed, and panel 420 includes another portion of the display components 150 and/or the circuitry. In one or more embodiments, panel 410 is similar to panel 400 in FIG. 4A, and panel 420 is a structural material affixed or attached to panel 410 for rigidity. In one or more embodiments, panel 410 is similar to panel 400 in FIG. 4A, and panel 410 is an acoustic or thermal barrier.

In FIG. 4C, panel 430 faces towards the viewer, panel 440 is positioned behind panel 430, and panel 450 is positioned behind panel 440. Panel 430 is similar to panel 400 in FIG. 4A, or similar to panel 410 in FIG. 4B. Panels 440 and 450 are similar to panel 420 in FIG. 4C.

FIGS. 4A-4C illustrate that Envirel 110 according to this disclosure may be manufactured and assembled in many different configurations and using many different types of materials. It should be understood that more than three panels may be used in the construction of Envirel 110. In one or more embodiments, Envirels 110 are mix-and-match, such that different types (e.g., model, generation, construction, shape, size, or capability) may be used on different portions of environ system 100. Master controller 130 may be programmed with information regarding types and positioning of Envirels 110 in the environ system 100.

Figure 5:
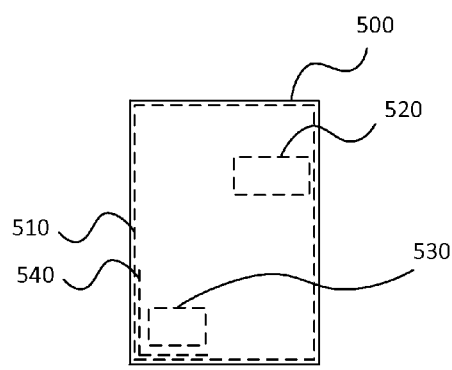
FIG. 5 is an illustration of an environ system panel according to an embodiment of the present disclosure.

FIG. 5 illustrates an example of an Envirel 500 as viewed from within environ system 100. A majority of, or all of, the surface of the Envirel 500 facing the viewer provides a display to the viewer. In one or more embodiments, Envirel 500 includes an optional setback from one or more outer edges of the surface, such as setback 510, which defines a keepout area. The keepout area may be at one or more edges, and is not used for display. The remainder of the surface of Envirel 500 (other than the keepout area) is used as a display area. In embodiments using setback 510, the keepout area may be reserved for attachment devices or structures such as hinges, hooks, braces, bars, rods, or frames, or may be reserved for water-sealing materials such as rubber or silicone.

Envirel 500 includes an optional control area 520 within the display area, which may be a defined portion of the display area in some embodiments, and in other embodiments may be moved around, such as by touching control area 520 (or a specific spot on control area 520) and "dragging" control area 520 to another position in the display area of Envirel 500 or another Envirel 500. Control area 520 allows a viewer inside an environ system 100 to adjust aspects of the environ system 100. For example, control area 520 may include options for selecting an environ to display, for changing settings, for viewing a clock, for accessing media, and so forth. More examples are provided with respect to FIG. 6.

In FIG. 5, Envirel 500 includes an optional electronics area 530, which is illustrated at a bottom corner of Envirel 500, but may be positioned elsewhere on Envirel 500. Electronics area 530 is positioned on any surface of Envirel 500, except that for applications where water or humidity is present, such as a shower or sauna, it may be preferable for electronics area 530 to be positioned on a surface not exposed to the water or humidity, if electronics to be positioned in electronics area 530 are water or humidity sensitive. Electronics area 530 may be positioned on a front or back surface of a panel of a single or multi-panel Envirel 500 (such as described with respect to FIGS. 4A-4C). Local controller 120, if applicable, may be positioned in electronics area 530, or may be formed on the surface of Envirel 500 in electronics area 530. The size of electronics area 530 may be defined by the included electronics; for example, an application specific integrated circuit (ASIC) may be used to implement local controller 120, and the size may be small, whereas local controller 120 may be implemented as circuits printed on Envirel 500, and the size may be large. Envirel 500 includes an optional antenna 540, shown in an L-shape for illustration purposes, but not limited thereto. Antenna 540 may be attached to, or formed on, a surface of Envirel 500, or may be embedded into a panel of Envirel 500, or between panels of Envirel 500. Antenna 540 may be electrically connected to electronics area 530. Antenna 540 may be used to receive and transmit data wirelessly within a local area network or personal area network (e.g., network 170).

Figure 6:
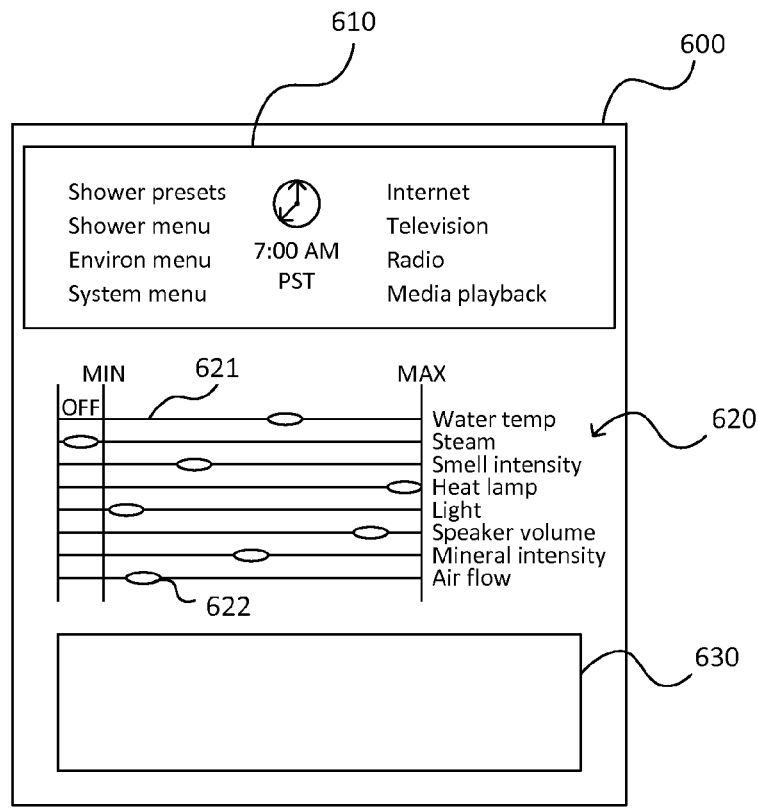
FIG. 6 is an illustration of a control panel for an environ system according to an embodiment of the present disclosure.

FIG. 6 illustrates an example of a control panel 600 according to an embodiment of the present disclosure. Control panel 600 is shown by way of non-limiting example as a shower control panel. Control panel 600 may be internal or external to environ system 100. For example, control panel 600 may be a physical device attached to a wall or a post near environ system 100. (In the neo-angle shower enclosure example of FIG. 3, control panel 600 may be attached to a wall next to environ system 300, or may be attached on an outward-facing surface of environ system 300.) Additionally or alternatively, control panel 600 may be a visual depiction, such as in control area 520 of FIG. 5. Accordingly, there may be two (or more) control panels 600 related to environ system 100, and control is shared. In embodiments including two or more control panels 600, each of the control panels 600 may provide the same control options, or may provide different control options; and the look of the different control panels 600 may be the same or different.

Control panel 600 includes menu area 610, which, in one or more embodiments, is a touch screen. Examples of touch screen menus are shown as shower presets, shower menu, environ menu, system menu, Internet, television, radio, media playback, and a clock with digital and analog views. The shower presets may include, for example, configurations selected in a setting area 620 and saved under a moniker, such as under a person's name or under a title given to the configuration. A person may then later select from the presets a configuration that suits the person's mood. The shower menu may include a selection of shower heads to activate, a water spray pattern for a shower head, a spray intensity of a shower head, water temperature settings for a shower head, and so forth. The environ menu may include lists or icons of available environs. The system menu may include system commands, such as locking out another control panel 600, setting a timer, and so forth. The Internet menu may include an Internet access selection, or a setup selection. The television and radio menus may include category or channel selections or the like. The media playback menu may include a selection of devices to activate, along with category or channel selections, such as for a video or audio player. These are some examples of menus and menu contents that may be included in menu area 610; many other types of menus and menu content may be additionally or alternatively used.

Setting area 620 includes slide bars 621 and sliders 622. In a physical control panel 600, slide bars 621 and sliders 622 may be implemented as a drag and drop touch screen display, or may be implemented as physical sliders 622 along slide bars 621 (such as rails or slots). In the embodiment illustrated, sliders 622 may be positioned in an "OFF" zone, or may be positioned between a "MIN" and a "MAX" setting. In the example shown, "Steam" is "OFF", a "Heat lamp" setting is "MAX", and a "Light" setting is nearly "MIN". A configuration of slider 622 positions may be saved as a preset for subsequent quick access.

Control panel 600 includes input area 630, which may be a physical keyboard in a physical control panel 600, or may be a touch screen keyboard display in a physical control panel 600 or in a visual depiction control panel 600.

As can be imagined from the figures and descriptions, control panel 600 may be designed for the environ system 100 to which it is connected. Thus, if environ system 100 is not a shower enclosure, then the selections related to showers may not be included. Further, as noted above, the contents of control panel 600 are illustrated by way of non-limiting example, and many other designs may be used instead.

In one or more embodiments, control panel 600 includes an audio interface, for hands-free communication. Such an audio interface may improve the experience, as control may continue without sight-enhancement (e.g., glasses, contacts, or magnification of the display, although magnification of the display may be included also as a feature of control panel 600). Further, in embodiments in which control panel 600 is external to environ system 100, control may continue without reaching outside of, or exiting, environ system 100. An audio interface may be initiated prior to activating an environ, or during provision of an environ. Audio interface activation may be manual or by issuing a sequence of audio commands or other vocalizations.

Environ system 100 may be high-resolution, meaning that local controllers 120 and/or master controller 130 are capable of controlling high-resolution Envirels 110. If, in a high-resolution environ system 100, high resolution is not needed (e.g., low-resolution Envirels 110 are used, or the displayed scene is low resolution), environ system 100 may be switched to a low-resolution mode. In one or more embodiments, environ system 100 is provided with a default display, such as the appearance of a tile or granite or other material. Such a default display may be selected in some embodiments. Accordingly, environ system 100 may be "redesigned" each day.

Figure 7:
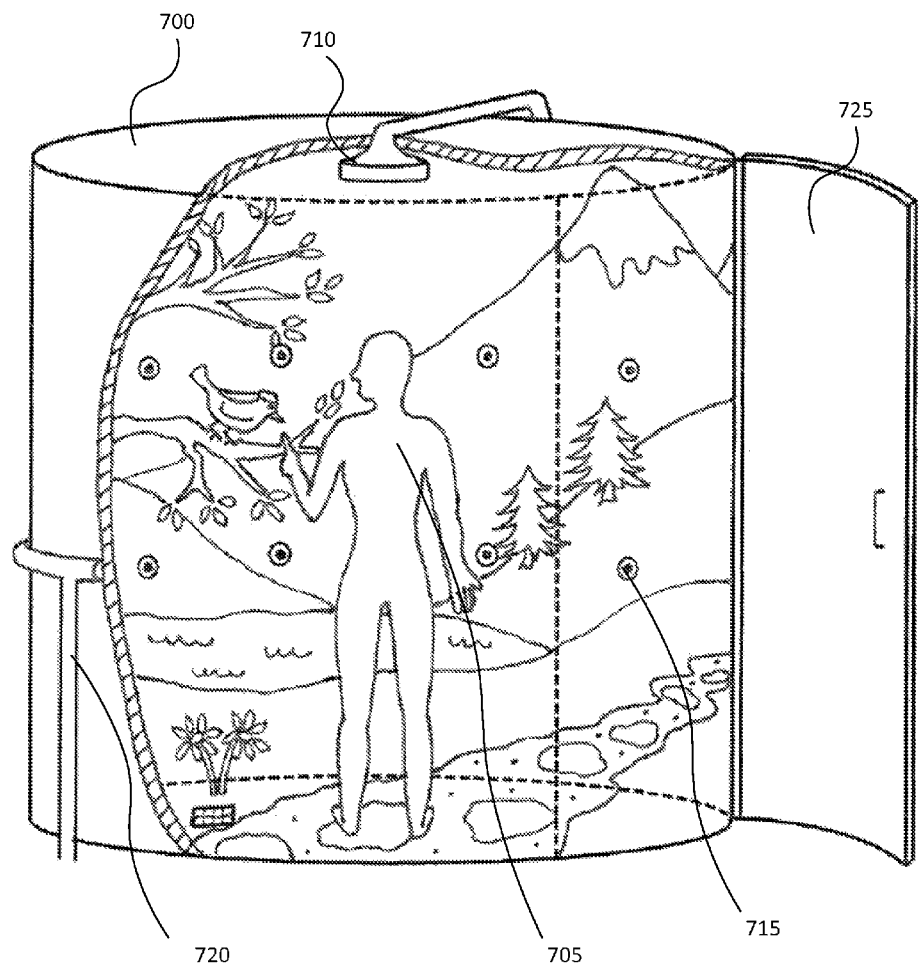
FIG. 7 is an illustration of an example environ system according to an embodiment of the present disclosure.

FIG. 7 illustrates an example of an embodiment of the present disclosure, in which environ system 100 is a cylindrical shower enclosure 700 with Envirels 110 fully surrounding the shower enclosure 700 to provide a 3D image of a scene; here, a pathway in the mountains in the Spring. A viewer 705 is illustrated within the shower enclosure 700, reaching out to "touch" a displayed bird, which, when "touched" or approached may be depicted as flying away. Other examples of animation in this scene include wind through the trees, lapping water in the lake, the bird fluffing its wings, and a change in the entire scene as viewer 705 makes stepping motions to indicate that viewer 705 is "walking" down the path.

Shower enclosure 700 as illustrated in FIG. 7 includes a shower head 710, spigots 715 (e.g., to provide water, spray, steam, scent, wind, or minerals), a pipe 720 connected to one or more spigots 715 (e.g., for delivery of the water, spray, steam, scent, wind, or minerals to spigots 715), a drain 720, and a door 725. Other components of shower enclosure 700 are not shown in this illustration.

Some examples of scenes for environ system 100 are provided above. Other examples include a bed of flower petals, an aquarium, Tuscany rolling hills, a prairie, farmland, wildflowers, Hawaiian tropics, marine life, a waterfall, a forest, a garden, a sunset, the night time galaxy (e.g., with glowing stars, shooting stars and floating meteors), a pasture, a cavern, lake views, a river or stream, stone formations, Roman pillars, ancient ruins, mountain peaks, a rainforest or jungle, a temple, a Deity or Ascended Master, a rainbow mist, color therapy (bold blocks of color), adult entertainment, a snowy scene (e.g., with snow falling), rain, bamboo, clouds, coral reefs, brightly colored fish, turquoise beaches, Venice, a Turkish bathhouse showcasing rich colored tiles, a dock, a lighthouse, city lights, empyreal light fractals, and balcony views of the Mediterranean.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. An environ system, comprising:
   a plurality of environ panels arranged to form a full shower or bath tub enclosure, wherein each environ panel includes a plurality of display components that together provide a display area across a majority of a surface of the environ panel facing inward within the enclosure;
   a plurality of local controllers, one or more local controllers of the plurality of local controllers connected to each of the plurality of environ panels, wherein each local controller is configured to control one or more display components to provide a visual display, and detect interactive movements; and
   a master controller connected to the plurality of local controllers;
   wherein the master controller is configured to provide control information to each local controller to coordinate a presentation of a visual display sequence across the plurality of environ panels, wherein the plurality of environ panels are configured to depict an interactive engaging environ such that when a user touches one or more objects presented by the visual display sequence, the master controller is configured to coordinate a modified presentation of the visual display sequence responsive to a touch, the modified presentation depicting one or more reactions of the one or more objects responsive to the touch according to a real environment, wherein the interactive engaging environ is provided across the plurality environ panels; and
   wherein the interactive engaging environ comprises trees, water, and animals, and the motion of the trees in wind, wherein the master controller is configured to control the plurality of environ panels to display one or more interactive responses responsive to detecting one or more user interactions, wherein the one or more user interactions comprise a user approaching or touching an animal, wherein the one or more interactive responses comprise the animal reacting to the approach or touch by flying or swimming away.

2. The environ system of claim 1, wherein the one or more user interactions comprise the user touching the water, and wherein the one or more interactive responses comprise the water being disturbed.

3. The environ system of claim 1, wherein the one or more user interactions comprise the user making a stepping motion, and wherein the one or more interactive responses comprise changing displayed scene as the user makes the stepping motion.

4. The environ system of claim 1, wherein the plurality of environ panels includes at least one of a ceiling panel or a floor panel and wherein the enclosure includes a fan input for receiving air, the air being provided in a condition consistent with the interactive engaging environ.

5. The environ system of claim 1, further comprising an environ enhancement generator configured to provide additional features including one or more of sound, wind, heat or cold to simulate responses to the touch according to the real environment.

6. The environ system of claim 1, wherein plurality of environ panels are configured to depict a full beach environ comprising sky, sand, water, and the animals in the water, wherein the master controller is configured to control the plurality of environ panels to display one or more interactive responses responsive to detecting one or more user interactions, wherein the one or more user interactions comprise the user touching the water, wherein the one or more interactive responses comprise the water being disturbed.

7. The environ system of claim 6, wherein the one or more user interactions comprise the user touching an animal of the animals in the water, wherein the one or more interactive responses comprise the touched animal reacting to the touch.

8. A shower enclosure system, comprising:
   a plurality of environ panels configured to provide a fully enclosed shower or bathtub, each environ panel including receptor components and display components;
   a controller coupled to the display components and to the receptor components, the controller configured to receive information from the receptor components and to provide information to the display components;
   wherein the information provided to the display components directs the display components of each environ panel to present a portion of a scene, such that the whole of the scene is displayed across a combination of the environ panels;
   an environ enhancement generator configured to generate one or more features based at least in part on the scene, the one or more features comprising generating wind, changing light and/or temperature within the shower enclosure, diffusing additives into shower water and/or air within the shower enclosure; and
   wherein the controller is further configured to alter the information provided to the display components and alter the one or more features generated by the environ enhancement generator responsive to the information from the receptor components, wherein the plurality of environ panels are configured to depict an interactive environ comprising trees, water, animals, wherein the controller is configured to control the plurality of environ panels to display one or more interactive responses responsive to detecting one or more user interactions, wherein the one or more user interactions comprise a user approaching or touching an animal, wherein the one or more interactive responses comprise the animal reacting to the approach or touch by flying or swimming away.

9. The shower enclosure system of claim 8, wherein the information from the receptor components is movement detection information.

10. The shower enclosure system of claim 8, wherein the information from the receptor components is touch detection information, wherein the one or more user interactions comprise touching one or more objects of the scene.

11. The shower enclosure system of claim 8, wherein the one or more user interactions comprise the user interacting with the water within the displayed scene, and wherein the interactive response comprises the water being disturbed.

12. The shower enclosure system of claim 8, wherein the controller is coupled to the environ enhancement generator, and wherein the controller is configured to provide control information to the environ enhancement generator to coordinate a provision of additional features coordinated with the displayed scene.

13. The shower enclosure system of claim 8, further comprising a control panel coupled to the controller, the control panel including a selection of scenes or the scene sequences to be displayed.

14. The shower enclosure system of claim 8, wherein the one or more user interactions comprise the user interacting with the animal within the displayed scene, and wherein the interactive response comprises the animal reacting to the one or more user interactions.

15. An environ system, comprising:

a plurality of adjacent environ panels forming a full shower or bathtub enclosure;

display components embedded in each environ panel such that a majority of an inward-facing surface of each environ panel forms a display;

a controller configured to control the display components of each environ panel to display a different scene sequence of different scene sequences, wherein the different scene sequences of the adjacent environ panels together simulate a three-dimensional view; and an environ enhancement generator configured to generate one or more features based at least in part on the simulated three-dimensional view, wherein the controller is further configured to coordinate the one or more features provided by the environ enhancement generator with the scene sequences of the simulated three-dimensional view, wherein the plurality of environ panels are configured to depict an interactive environ comprising trees, water, animals, and trees motions within wind, wherein the controller is configured to control the plurality of environ panels to display one or more interactive responses responsive to detecting one or more user interactions, wherein the one or more user interactions comprise a user approaching or touching an animal, wherein the one or more interactive responses comprise the animal reacting to the approach or touch by swimming or flying away.

* * * * *